(12) United States Patent
Lutes et al.

(10) Patent No.: US 10,508,946 B2
(45) Date of Patent: Dec. 17, 2019

(54) WET SCREED HARDWARE APPARATUS

(71) Applicant: Stego Industries, LLC, San Clemente, CA (US)

(72) Inventors: James Steven Lutes, Sacramento, CA (US); Joe Marks, Erie, CO (US)

(73) Assignee: Stego Industries, LLC, San Clemente, CA (US)

( * ) Notice: Subject to any disclaimer, the term of this patent is extended or adjusted under 35 U.S.C. 154(b) by 445 days.

(21) Appl. No.: 15/422,431

(22) Filed: Feb. 1, 2017

(65) Prior Publication Data

US 2018/0216357 A1    Aug. 2, 2018

(51) Int. Cl.
| | | |
|---|---|---|
| *G01F 23/00* | (2006.01) | |
| *E04F 21/24* | (2006.01) | |
| *E04G 21/10* | (2006.01) | |
| *E01C 23/01* | (2006.01) | |
| *E04B 1/41* | (2006.01) | |
| *E04B 5/32* | (2006.01) | |

(52) U.S. Cl.
CPC .......... *G01F 23/0007* (2013.01); *E01C 23/01* (2013.01); *E04B 1/4114* (2013.01); *E04B 5/32* (2013.01); *E04F 21/241* (2013.01); *E04G 21/10* (2013.01)

(58) Field of Classification Search
CPC ....... G01F 23/0007; E04G 21/10; E04B 5/32; E04B 1/4114; E04F 21/241; E01C 23/01
See application file for complete search history.

(56) References Cited

U.S. PATENT DOCUMENTS

| | | | | |
|---|---|---|---|---|
| 1,744,577 | A * | 1/1930 | Robinette | A46B 15/00 15/166 |
| 2,410,343 | A * | 10/1946 | Haivala | E04F 21/241 15/235.6 |
| 2,524,168 | A * | 10/1950 | Harnish, Jr. | B23K 37/053 269/296 |
| 2,558,998 | A * | 7/1951 | Yearout | G01F 19/005 222/386 |
| 3,021,033 | A * | 2/1962 | Maurer | A47J 47/01 222/309 |
| 3,119,138 | A * | 1/1964 | Davis | B05C 17/10 15/104.001 |
| 4,371,330 | A * | 2/1983 | Heffernan | E04G 21/10 280/28.17 |
| D270,971 | S * | 10/1983 | Stevens | D4/132 |
| 4,837,940 | A * | 6/1989 | Mahan | E02F 3/765 172/239 |
| 5,269,625 | A * | 12/1993 | Stewart | E01C 19/44 15/235.4 |
| 5,350,021 | A * | 9/1994 | Walker | A01B 1/225 172/13 |
| 5,491,905 | A * | 2/1996 | Jablonski | E04F 21/00 33/481 |
| 5,540,519 | A * | 7/1996 | Weber | E01C 19/402 15/235.4 |

(Continued)

*Primary Examiner* — Justin Seo
*Assistant Examiner* — Tania C Courson
(74) *Attorney, Agent, or Firm* — Lee & Hayes, P.C.

(57) ABSTRACT

A screed hardware apparatus for adjusting a grade height in screeding concrete. The apparatus includes a cap configured to attach to a base. The cap includes a post mount portion, a grade surface portion that abuts the post mount portion, and one or more flexible antenna that extend from the grade surface portion.

19 Claims, 5 Drawing Sheets

(56) References Cited

U.S. PATENT DOCUMENTS

| | | | | |
|---|---|---|---|---|
| 5,671,553 A * | 9/1997 | Burkhart | | E01C 19/15 172/372 |
| 5,778,482 A * | 7/1998 | Sbrigato | | E04F 21/241 15/235.4 |
| 5,915,794 A * | 6/1999 | Neff | | A47L 13/022 15/143.1 |
| 5,946,871 A * | 9/1999 | Kassardjian | | B29C 45/14065 138/96 R |
| 5,966,771 A * | 10/1999 | Stroud | | A46B 3/005 15/117 |
| 6,108,854 A * | 8/2000 | Dingert | | A46B 9/02 15/188 |
| 6,581,236 B2 | 6/2003 | Jennings | | A47L 13/10 15/144.1 |
| 7,185,388 B2 * | 3/2007 | Sander | | A47L 13/11 15/245 |
| 7,363,675 B2 * | 4/2008 | Gavney, Jr. | | A46B 9/005 15/110 |
| 7,610,728 B1 * | 11/2009 | Manocchia | | E02D 27/01 248/357 |
| D636,548 S * | 4/2011 | Hoover | | D32/49 |
| 7,934,284 B2 * | 5/2011 | Braun | | A46B 15/0002 15/110 |
| 8,066,080 B1 * | 11/2011 | Hanson | | A01B 1/02 172/13 |
| 8,540,167 B2 * | 9/2013 | Pugh | | A01B 1/00 239/289 |
| 8,763,270 B1 * | 7/2014 | Spear, IV | | G01B 5/066 33/518 |
| 9,758,975 B2 * | 9/2017 | Lutes | | E04F 21/241 |
| 9,765,533 B2 * | 9/2017 | Lutes | | E04F 21/241 |
| 10,113,323 B2 * | 10/2018 | Lutes | | E04G 17/14 |
| 2001/0034946 A1 * | 11/2001 | Hamdorf | | G01C 9/28 33/451 |
| 2011/0179591 A1 * | 7/2011 | Perry | | A47L 13/26 15/41.1 |
| 2019/0063087 A1 * | 2/2019 | Lutes | | E04G 17/14 |

\* cited by examiner

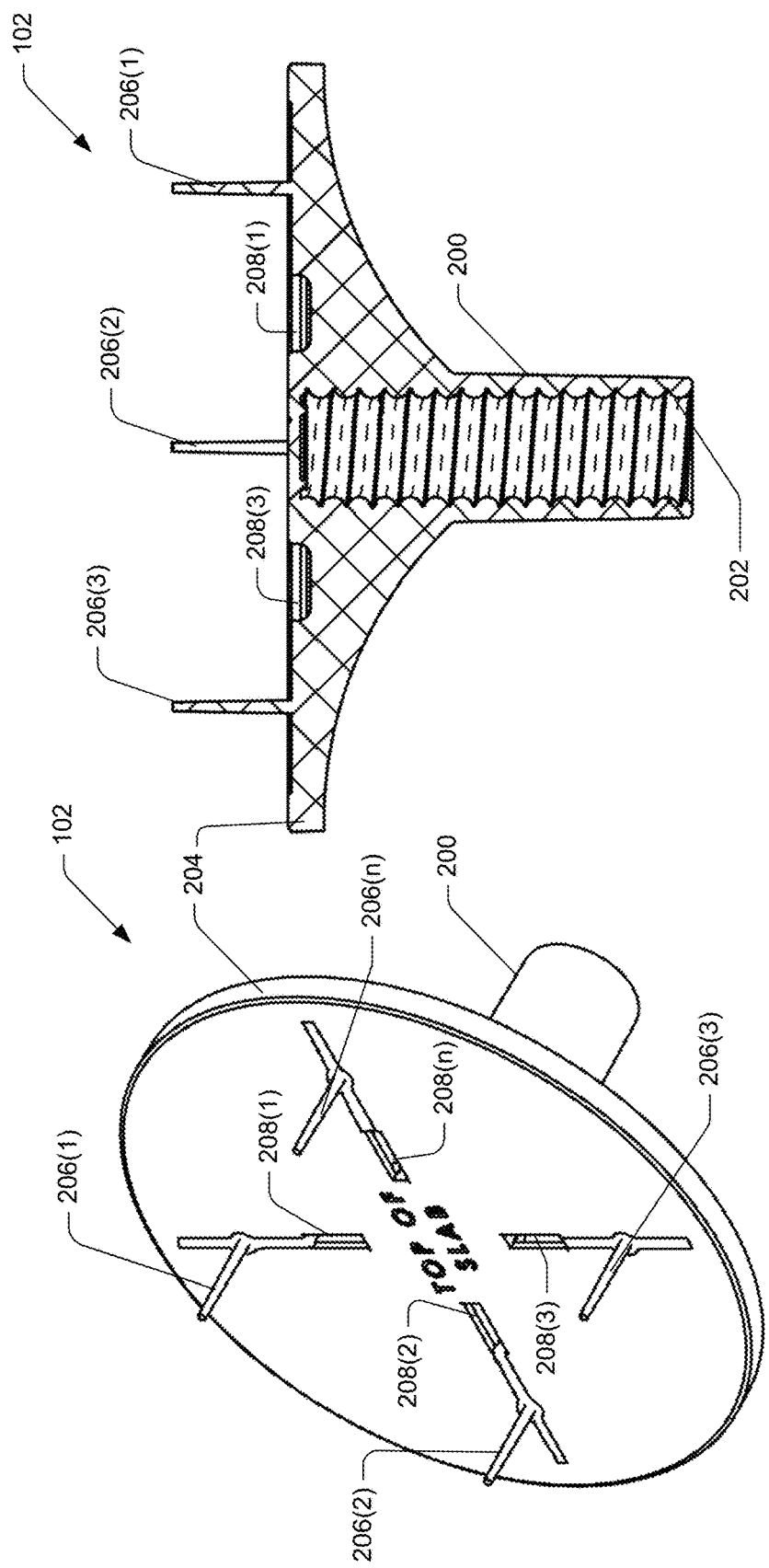

WET SCREED HARDWARE APPARATUS

BACKGROUND

When a large area of concrete is poured, it may be desirable to maintain the same grade or elevation across the entirety of the surface. While this might be simply achieved over a small area, large areas are generally more challenging and generally require some form of grade or elevation markers. One approach to maintaining the grade across a large area is to divide the area into smaller strips or bays, into which concrete will be poured individually and adjacent in conjunction with one another while the concrete is wet. The grade is achieved on the first slab and the grade for each subsequently poured strip is based, in part, on the grade of the first slab. This is generally done by an individual who uses a hand float to level out a small portion of the concrete and uses a sight rod or laser level to ensure that it is level before marking that portion as top of slab. This may sometimes be referred to as wet screeding. The remaining concrete in that particular strip is then screeded based on the marked top of slab portion.

Basically, wet screeding is a process of establishing grade or elevation on the surface area of poured concrete. More specifically, wet screeding is the act of striking off freshly placed concrete with a straight edge to a set or desired elevation by means of using adjacent strips, ribbons, or pads of concrete which have already been screeded or floated to the desired elevation, and while the adjacent concrete is still in a plastic state. As the straight edge is pulled across the top of the concrete, excess concrete is pulled out of the way to make a level surface, and places that are too low have concrete added to them until the grade is uniform. Once a bay or strip of the concrete slab is screeded, the adjacent bay or strip is poured and the grade for the newly poured concrete is based, in part, on the previously completed bay or strip.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

FIG. 2A illustrates a perspective view of a cap of the screed hardware apparatus depicted in FIG. 1.

FIG. 2B illustrates a cross-sectional view of the cap depicted in FIG. 2A.

DETAILED DESCRIPTION

Overview

Figure 1:
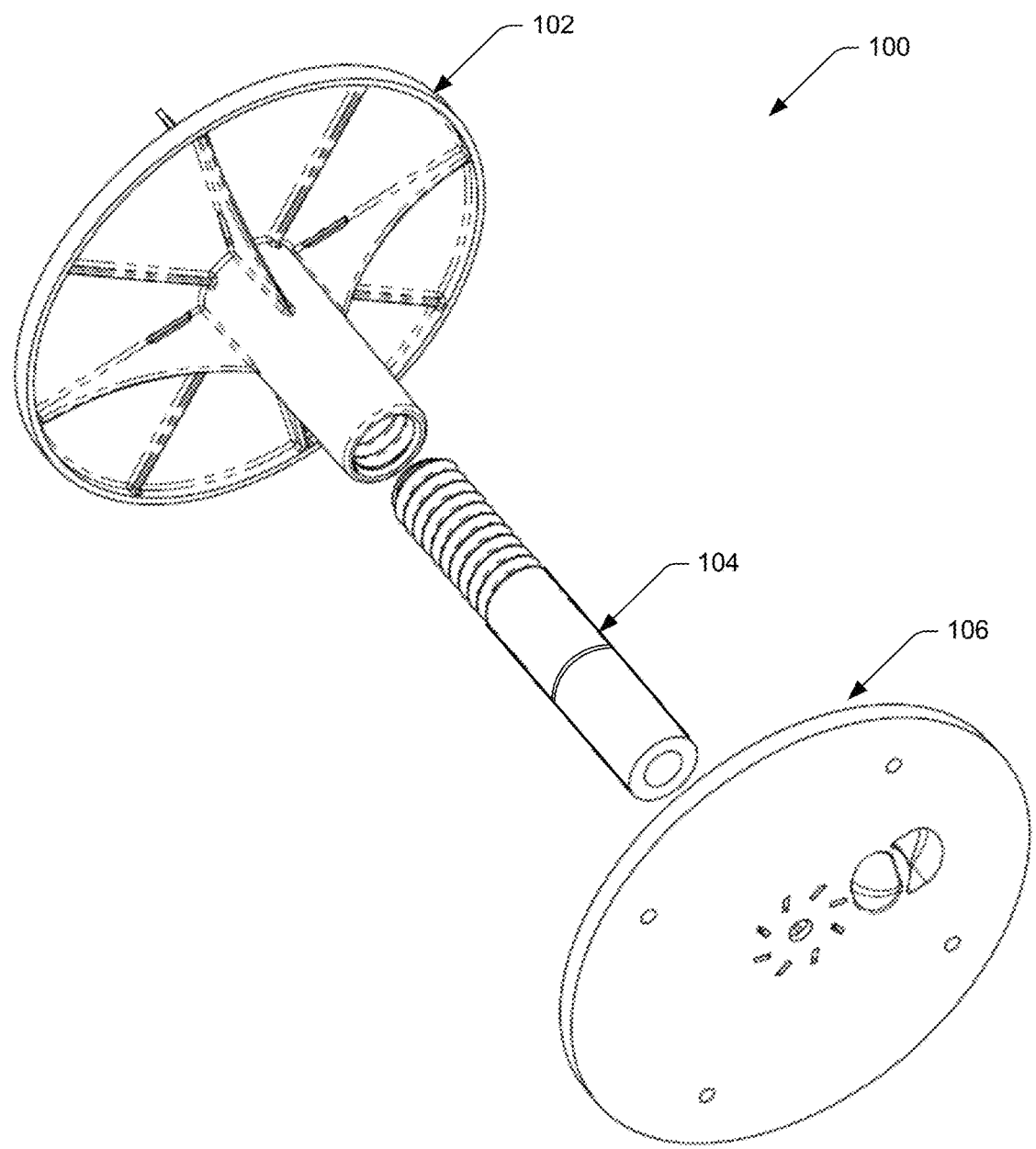
FIG. 1 illustrates an exploded perspective view of a screed hardware apparatus according to an embodiment of the instant application.

This disclosure is directed to improvements in a hardware apparatus for use in screeding concrete. When a large area of concrete is constructed, it may be desirable to maintain the same grade or elevation across the entirety of the surface. Due to the nature of wet concrete being somewhat fluid prior to hardening, it may be a challenge to ensure an accurate grade or elevation in the strip. In an embodiment according to features described herein, a screed hardware apparatus may be used to assist in maintaining a desired grade or elevation. Specifically, an individual may place one or more units of the hardware apparatus described herein on the surface where the concrete will be poured. The features of the hardware apparatus allow for the height of the apparatus to be adjusted as needed to establish the appropriate grade or elevation. The concrete may be poured while the hardware apparatuses are in place and the person pouring the concrete may be able to better determine how much concrete to pour by pouring the concrete to the height of the hardware apparatus. The hardware apparatus, or at least a portion thereof, may be retrieved from the strip as the concrete is screeded at the height of the hardware apparatus.

In an embodiment, the hardware apparatus may include a peel-and-stick base portion. When a hardware apparatus is to be placed on a surface, the user may peel a sheet from the base portion, thereby exposing adhesive, and the hardware apparatus may be set down with the adhesive facing the surface. The hardware apparatus may then stick to the surface and support the hardware apparatus as a grade marker in an upright position so that the concrete may be easily poured and screeded to the level of the hardware apparatus without concern that the hardware apparatus will fall.

Accordingly, the screed hardware apparatus described herein may accurately and effectively assist a user in quickly pouring and screeding concrete. In the following paragraphs, various embodiments of a screed hardware apparatus including a base, an adhesive member, a post, and a cap are described. Nevertheless, improvements made to any individual components may be discussed in more detail than some of the other components. Further, the description of improvements of individual components is not intended to minimize the patentability of the apparatus as a whole unit or system.

It is noted that suitable materials for producing any of the base, the post, and the cap may include, but are not limited to: metal (e.g., steel, aluminum, etc.), plastic, cardboard, ceramic, glass, natural materials such as wood, synthetic materials, or any combination thereof. For example, a portion of the base may be made of cardboard while another portion of the base may include plastic. Further, the materials of the individual parts may differ from the material of the other parts. For example, the base may be plastic, while the post may be metal, or vice versa. Moreover, potential materials for the adhesive of the instant application may include, but are not limited to: acrylics, such as a pressure sensitive acrylic; butyl or resinous, rubber based synthetics; and epoxy.

An embodiment of a screed hardware apparatus 100 that may be used in the screeding process is depicted in FIG. 1.

Screed hardware apparatus 100 may include a cap 102 that may be used as a grade marker, a post 104 that connects to cap 102 on a first end thereof, and a base 106 to support post 104 and cap 102 via a connection with post 104. It is noted that the view of the components in FIG. 1 shows the underside of cap 102 and base 106. Additional views are seen in FIGS. 2A-4, and described further herein.

Figure 2C:
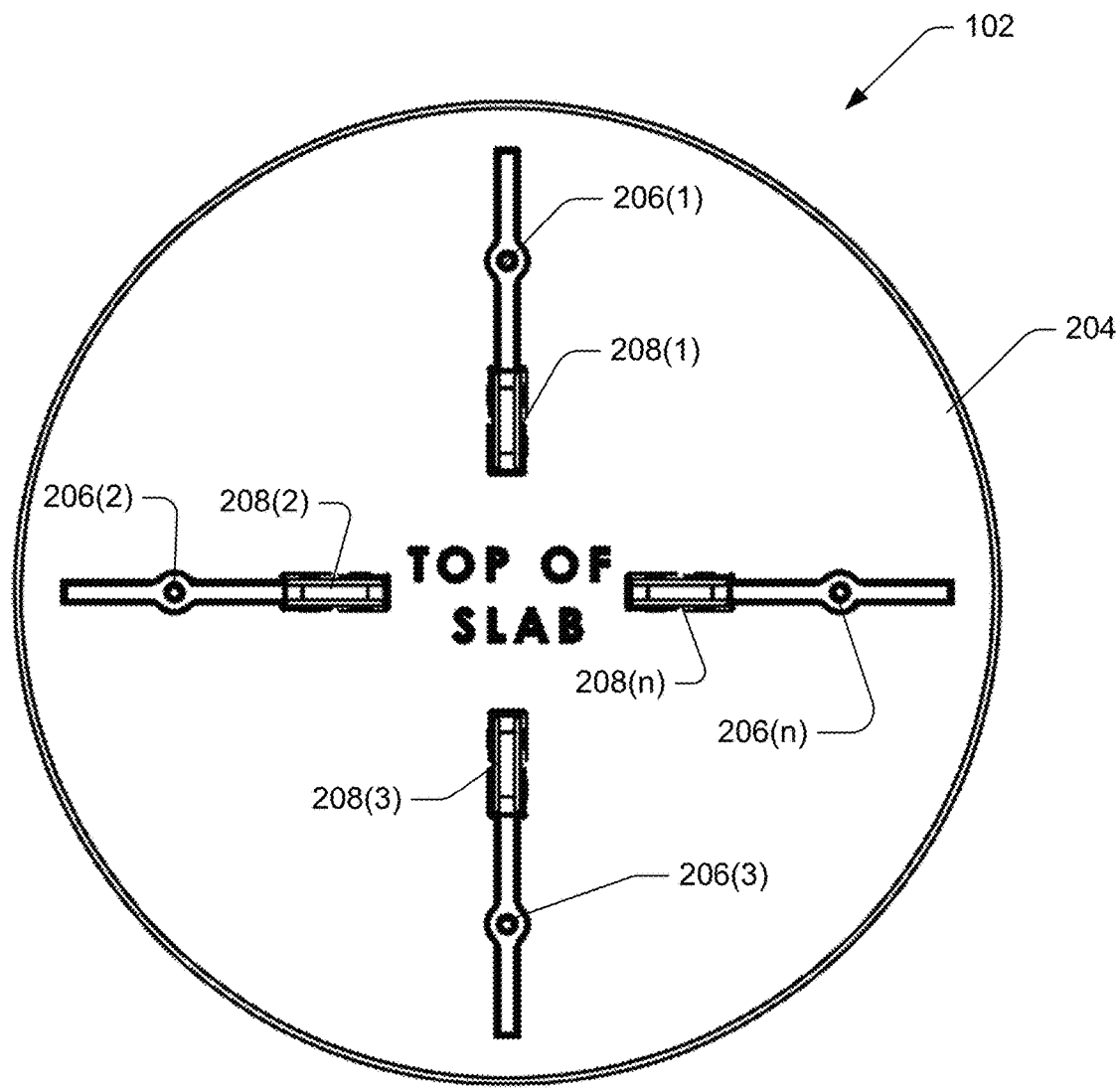
FIG. 2C illustrates a top view of the cap depicted in FIG. 2A.

Each of FIGS. 2A-2C depict the same cap 102 from different views. Specifically, in FIG. 2A, an isometric view of cap 102 is depicted from a top side of cap 102. In FIG. 2B, a cross-sectional side view of cap 102 is shown, and in FIG. 2C, a top plane view of cap 102 is shown. Inasmuch as aspects/features of cap 102 may appear in more than one of FIGS. 2A-2C, some of the aspects/features of cap 102 may be labeled and referenced in more than one of FIGS. 2A-2C.

As further depicted in FIGS. 2A-2C, cap 102 includes a post mount portion 200. Post mount portion 200 may include a tubular structure that is sized and configured to receive post 104. In an embodiment, post mount portion 200 may further include a threaded interior surface 202 that engages with post 104 to secure cap 102 on post 104. A threaded engagement between cap 102 and post 104 may function to allow a wide range of minute to large adjustments in height at precise measurements to ensure that the grade of the concrete (when poured and screeded) is accurate and consistent with the desired grade as set by the implementation of a plurality of hardware apparatuses. However, it is contemplated that interior surface 202 of cap 102 may have smooth walls, or other frictional textures via which post 104 may engage cap 102 and via which a height of cap 102 on post 104 may be adjustable.

Cap 102 may further include a grade surface portion 204, which may be used by a user to accurately screed the poured concrete after placing and adjusting the hardware apparatus 100 to the correct grade. That is, a user may use the top, planar surface of the grade surface portion 204 as a height indicator for the level of concrete when screeding the surface of the concrete. Hence, the etching (or writing) on grade surface portion 204, "TOP OF SLAB." A user may use a laser for example to determine the grade height, and adjust the grade surface portion 204 to align with the desired top of the slab of concrete, as described above.

While grade surface portion 204 is nearly completely planar, cap 102 may include one or more antennae 206(1), 206(2), 206(3), . . . , 206(n). Antennae 206(1)-206(n) may be semi-rigid, yet pliable, thin elongated protrusions that extend vertically from grade surface portion 204 to assist a user in finding hardware apparatus 100 after screeding concrete over a hardware apparatus 100 to remove cap 102 and/or post 104. Moreover, a material chosen for antennae 206(1)-206(n) may have properties of semi-rigidity in a neutral environment in order to cause antennae 206(1)-206(n) to remain vertical for visibility purposes. However, the material for antennae 206(1)-206(n) may also have elastic properties such that, during screeding, a screed apparatus may pass over and across antennae 206(1)-206(n) causing antennae 206(1)-206(n) to bend and lay down until after the screed apparatus has passed, at which point antennae 206(1)-206(n) elastically flex upward into a vertical or near vertical position again. Thus, while antennae 206(1)-206(n) may be semi-rigid, the material chosen may also exhibit elastic properties so as to not interfere with the screeding process. After screeding, a user may easily locate the caps of the hardware apparatuses used because antennae 206(1)-206(n) may have returned to a vertical position sticking out of the concrete. It is noted that the material of antennae 206(1)-206(n) may be somewhat durable as well to avoid breaking antennae 206(1)-206(n) while screeding.

Additionally, and/or alternatively, cap 102 may further include one or more apertures 208(1), 208(2), 208(3), . . . , 206(n). Apertures 208(1)-208(n) are depicted as rectangular slots in grade surface portion 204. However, a shape of apertures 208(1)-208(n) may vary according to a tool (not shown) that a user chooses to insert therein. Apertures 208(1)-208(n) may assist the user in making fine adjustments to the elevation by rotating cap 102 while the user remains in an upright or standing position to set the final elevation of cap 102 prior to screeding the concrete. Conventionally, elevation (i.e., height of the apparatus) adjustment to the grade of a slab requires two individuals to complete the work—a first individual to adjust the elevation while positioned in a bent over position, and a second individual to use a laser check-rod to ensure accuracy of the elevation. In contrast, with cap 102 having one or more apertures 208(1)-208(n), as discussed herein with respect to the instant disclosure, a single individual may remain in a standing position (for example, at the laser check-rod) and adjust the elevation remotely using a tool configured to fit the one or more apertures 208(1)-208(n). In addition to facilitating fine adjustments in elevation, one or more apertures 208(1)-208(n) may be grasped to assist in removal of cap 102 with or without post 104 after screeding the concrete. Furthermore, apertures 208(1)-208(n) may be located in substantial alignment with a position of antennae 206(1)-206(n). Aligning apertures 208(1)-208(n) with antennae 206(1)-206(n) may provide a user with the ability to instantly identify the location on cap 102 of apertures 208(1)-208(n) to be able to directly insert the tool and make rotational adjustments to cap 102 while in an upright or standing position, or remove cap 102 with or without post 104.

Cap 102 may include additional and/or other features that assist a user in locating the caps of hardware apparatuses after screeding. For example, a material of cap 102 may have a brightly colored appearance, such as a yellow color, that is distinct from the color of the concrete. Nevertheless, yellow is only one example of colors that may be distinct from the color of concrete, and which are easily identifiable by a visual review of a concrete slab. That is, other colors may be used as well.

Figure 3A:
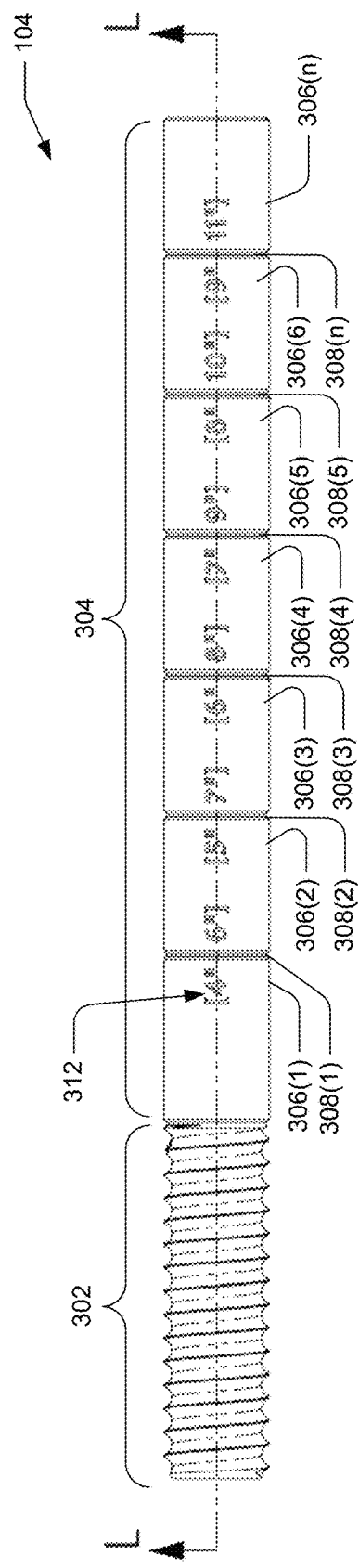
FIG. 3A illustrates a side view of a post of the screed hardware apparatus depicted in FIG. 1.
Figure 3B:
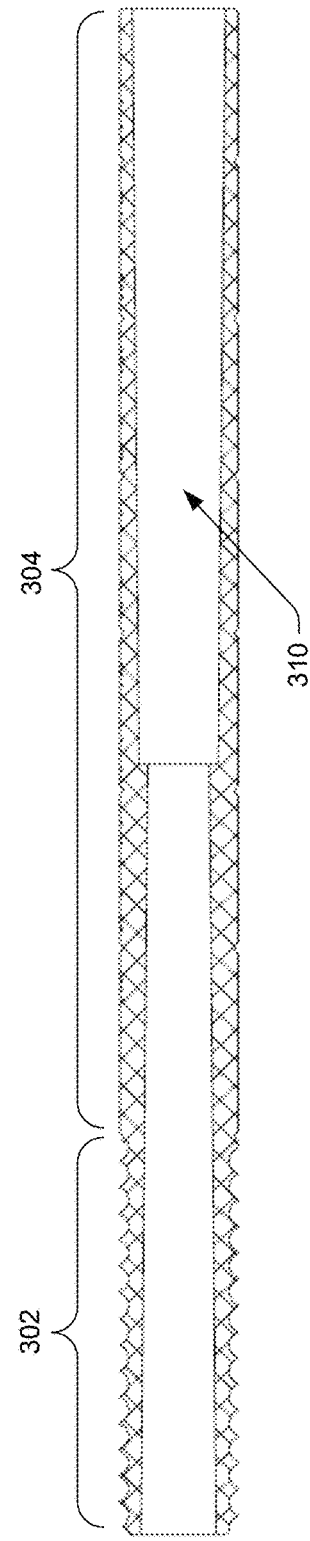
FIG. 3B illustrates a cross-sectional view of the post of FIG. 3A.

Turning to post 104, FIGS. 3A and 3B depict various features of post 104 in a side view and cross-sectional side view at line L-L, respectively. In an embodiment, post 104 may include a first segment 302 and a second segment 304. First segment 302 may be threaded to engage interior surface 202 of post mount portion 200 of cap 102. Second segment 304 may have relatively smooth siding (compared to the threaded sides of first segment 302) and may connect to base 106 via an interference fit. Alternatively, first segment 302 may have different frictional textural features via which cap 102 may engage first segment 302 to be secured thereon, including via an interference fit. For the purposes of this application, an interference fit occurs when an extension or protrusion of a first element of a device is pressed into an opening in a second element of the device. The opening is correspondingly shaped to accommodate the extension or protrusion, yet the opening is dimensioned smaller than the external dimensions of the first element, such that there exists "interference" between the exterior walls of the extension or protrusion and the interior walls of the opening. As a consequence of the interference, increased friction may exist between the first and second elements. Thus, when connecting the first element and the second element, additional force may be needed to press fit the first element into the second element to overcome the increased friction caused by the interference.

Second segment 304 of post 104 may include two or more sub-segments 306(1), 306(2), 306(3), 306(4), 306(5), 306(6), ..., 306(n) that are sub-portions of second segment 304, as "divided" by one or more annual notches 308(1), 308(2), 308(3), 308(4), 308(5), ..., 308(n). Although sub-segments 306(1)-306(n) are not physically detached from each other in FIGS. 3A and 3B, annular notches 308(1)-308(n) (also called "kerfs") may be cut or molded into the wall of second segment 304 and distributed along a length thereof. Annular notches 308(1)-308(n) may facilitate a user in cutting post 104 to make significant height adjustments to a desired length prior to making fine height adjustments with the engagement between cap 102 and post 104. In an embodiment, the outer diameter of each of the two or more sub-segments 306(1)-306(n) is substantially equal, which permits a user to cut post 104 to any desired length while still allowing an interference fit into base 106. That is, since the diameter of the hole (not shown) in base 106, into which second segment 304 may be inserted, remains the same despite insertion or removal of post 104 when adjusting the height thereof to be consistent with the desired grade of the concrete pad, it follows that any portion of post 104 that may be inserted into base 106 has the same diameter.

Furthermore, post 104 may be hollow having a cavity 310 therein surrounded by a tubular wall having a predetermined thickness. The hollow cavity 310 also may simplify the task of cutting post 104 to a desired length since there is less material through which to cut. In an embodiment, a depth of annular notches 308(1)-308(n) into the tubular wall may be less than half a thickness of the tubular wall (as depicted in FIG. 3B), thereby maintaining structural integrity of post 104.

In addition to annular notches 308(1)-308(n), post 104 may include visual indicators 312, shown in FIG. 3A, via which the height (or length) of post 104 may be determined. Visual indicators 312 may include, for example, numbers printed on or etched into post 104 according to a measurement system. Visual indicators 312 may be marked at predetermined intervals along post 104 (e.g., at each of the one or more annular notches 308(1)-308(n), in between annular notches 308(1)-308(n), continuously in regular intervals, etc.). In an embodiment, the spacing between annular notches 308(1)-308(n) may be, for example, approximately one inch on second segment 304 of post 104. Further, first segment 302 may permit approximately 2 inches overall height adjustment of cap 102. Thus, in combination, such spacing and adjustability of cap 102 may enable a user to cut post 104 at the desired depth of the concrete slab and still have one inch of adjustment up and one inch of adjustment down to allow for a wide variance in slab depth. Notably, the spacing of one inch between annular notches 308(1)-308(n) and the adjustability of two inches of cap 102 are simply examples, and it is contemplated that the spacing and adjustability may be higher or lower than the stated example amounts.

Figure 4:
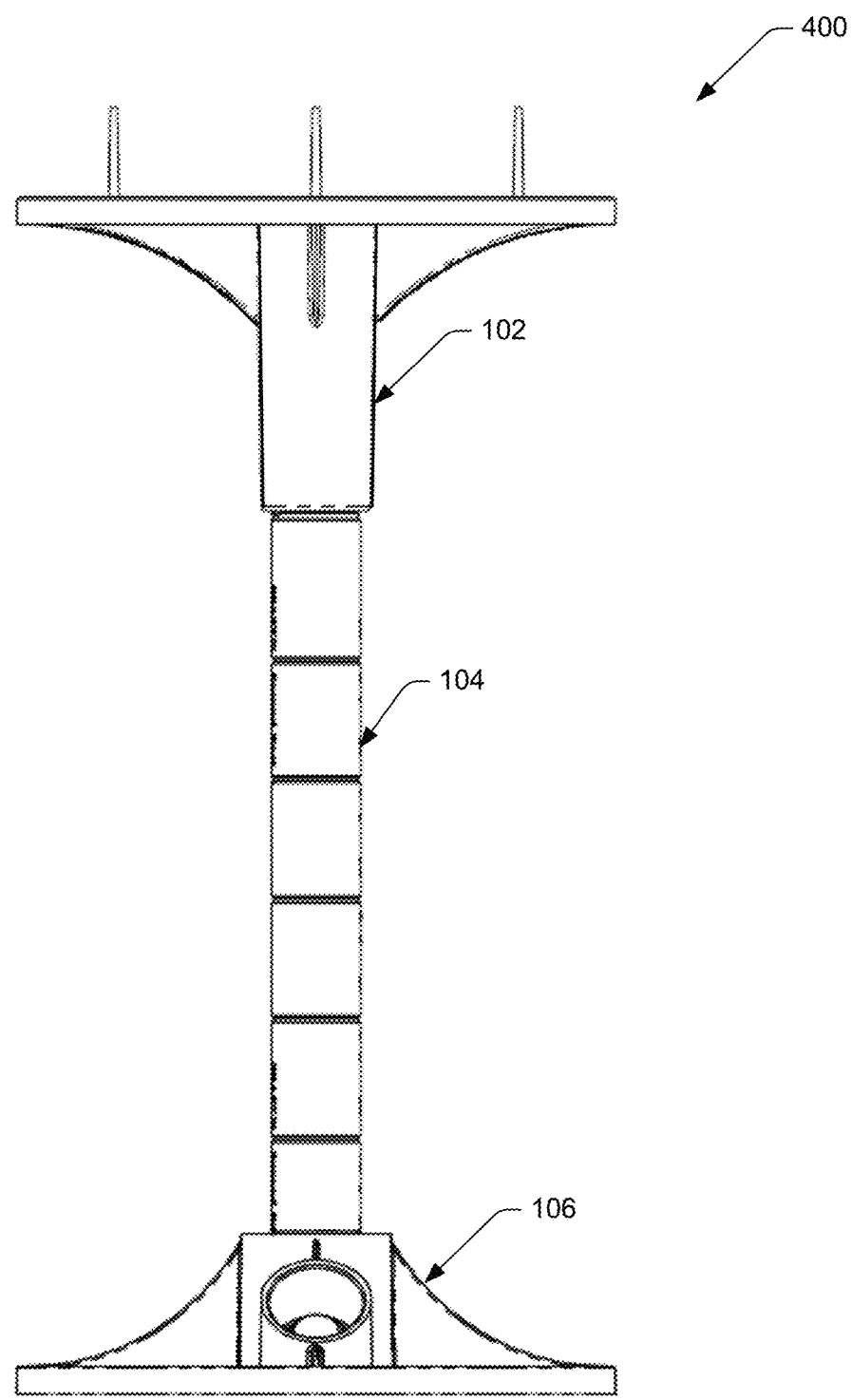
FIG. 4 illustrates a side view of the assembled screed hardware apparatus depicted in FIG. 1.

In FIG. 4, an assembled hardware apparatus 400 is depicted. In view of the above description, it is contemplated that post 104 may be left in the original size or cut shorter as desired by cutting one or more sub-segments conveniently along an annular notch. Fine adjustments to the height to ensure the correct grade for the concrete slab may be made by engaging cap 102 with post 104 as much or as little as needed, by rotational engagement or other means with the post mount portion of cap 102 and the first segment of post 104. Once post 104 is the correct length, second segment of post 104 is inserted into base 106, and apparatus 400 is ready for use.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A screed hardware apparatus for adjusting a grade height in screeding concrete poured over a post extending vertically from a horizontal surface, comprising:
   a cap configured to attach to a base, the cap including:
      a bottom portion including a post mount to engage and mount the cap to the post,
      a top portion including a grade surface disposed opposite the post mount, and
      one or more flexible antenna that extend from the grade surface.

2. The apparatus according to claim 1, wherein the cap further includes one or more apertures formed in the grade surface, a shape of the one or more apertures sized to permit a user to rotationally adjust the cap about the post while the user remains in an upright or standing position.

3. The apparatus according to claim 2, wherein the one or more apertures are aligned with the one or more antenna such that the one or more antenna provide a visual locator for the cap and the apertures in the cap to facilitate rotational adjustments while the user remains in the upright or standing position.

4. The apparatus according to claim 1, wherein the post mount includes a threaded tube.

5. The apparatus according to claim 1, wherein the cap is colored distinctly from a color of the concrete to increase visibility when used in screeding.

6. The apparatus according to claim 1, further comprising the post having an end correspondingly configured to engage the cap at the post mount.

7. The apparatus according to claim 6, wherein the post includes:
   a threaded portion, and
   a length indicator portion having at least two annular notches distributed at predetermined intervals along a length of the length indicator portion of the post so as to form length segments between adjacent notches, each notch including a number associated therewith.

8. A screed hardware apparatus for adjusting a grade height in screeding concrete, comprising:
   a post configured to attach to a base, the post including:
      a threaded portion, and
      a length indicator portion having at least two annular notches distributed at predetermined intervals along a length of the length indicator portion of the post so as to form length segments between adjacent notches,
   wherein respective diameters of the length segments are approximately equal; and
   a cap having a mount to attach to an end of the post opposite the base, the cap including a grade surface having at least one flexible antenna that extends directly from the grade surface.

9. The apparatus according to claim 8, wherein the post is hollow, and a depth of the at least two annular notches extends a predetermined depth into a wall of the post without penetrating through the wall.

10. The apparatus according to claim 9, wherein the predetermined depth is less than half a thickness dimension of the wall.

11. The apparatus according to claim 8, wherein a length of the post is adjustable via cutting the post at the one or more annular notches.

12. The apparatus according to claim 8, wherein the length indicator portion includes at least one length measurement notation on a wall surface thereof, the at least one notation located adjacent to the one or more annular notches.

13. The apparatus according to claim 8, wherein the cap engages the threaded portion of the post, and
wherein the cap further includes:
   a post mount to attach to the threaded portion of the post, the post mount disposed opposite the grade surface, and
   one or more flexible antenna that extend from the grade surface.

14. The apparatus according to claim 13, wherein the grade surface is planar with exception of the flexible antenna extending therefrom.

15. A screed hardware apparatus for adjusting a grade height in screeding concrete, comprising:
a cap including:
   a bottom portion including a post mount,
   a top portion including a grade surface disposed opposite the post mount, and
   one or more flexible antenna that extend from the grade surface; and
a post configured to attach to the cap, the post including:
   a cap attachment segment to attach to the cap at the post mount portion, and
   a length indicator portion having at least two annular notches distributed at predetermined intervals along a length of the length indicator portion of the post so as to form length segments between adjacent notches.

16. The apparatus according to claim 15, wherein the post mount of the cap and the cap attachment segment of the post are configured to threadingly engage.

17. The apparatus according to claim 15, wherein the cap further includes an aperture in the grade surface disposed in alignment with each of the one or more antenna, respectively.

18. The apparatus according to claim 15, further comprising a base to which the post attaches at the length indicator portion.

19. The apparatus according to claim 18, wherein the length indicator portion includes a plurality of annular notches, and
wherein a diameter of the post between each of the notches, respectively, is equal such that each subsegment of the length indicator portion is insertable into the base.

* * * * *